Dec. 27, 1938.  G. CARLSON ET AL  2,141,290
ELECTRIC CABLE
Filed Oct. 30, 1934
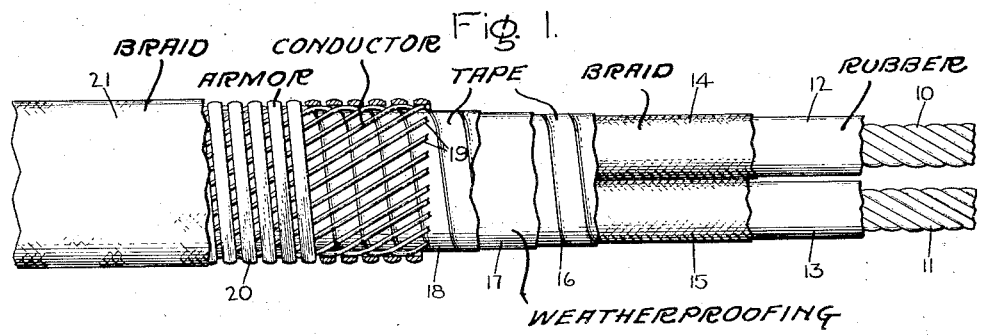
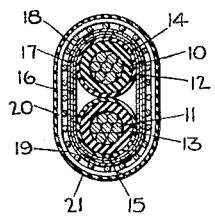
Inventors:
George Carlson,
Homer G. Knoderer,
by Harry E. Dunbar
Their Attorney.

Patented Dec. 27, 1938

2,141,290

UNITED STATES PATENT OFFICE 2,141,290

ELECTRIC CABLE

George Carlson, Bridgeport, and Homer G. Knoderer, Fairfield, Conn., assignors to General Electric Company, a corporation of New York Application October 30, 1934, Serial No. 750,622

4 Claims. (Cl. 173—266)

Our invention relates to electric cables and more particularly to armored cables for outdoor use.

The object of our invention is to provide an improved weatherproof armored cable for use in interconnecting a house wiring circuit to a supply source which has improved weather resistant characteristics and increased dielectric strength.

What we consider to be novel and our invention will be better understood by reference to the following specification and appended claims when considered in connection with the accompanying drawing in which Fig. 1 is a plan view of our improved cable with adjacent layers of insulation cut away to expose the layers beneath and Fig. 2 is a sectional view.

Referring to the drawing, 10 and 11 indicate two conductors which, as shown, are of the stranded type. Over the conductors 10 and 11, rubber insulation 12 and 13 is provided respectively. Over the rubber insulation 12 and 13, cotton braids 14 and 15 are provided. Around the combined conductors 10 and 11 and their insulation, a tape 16 is wound spirally. The tape 16 may be formed of paper or other fibrous material and it may be desirable to use a rubber filled tape. Over the tape 16 a layer 17 of weather-proofing compound such as asphalt pitch is provided, the tape 16 serving to protect the conductors 10 and 11 and their insulation from impregnation by its sticky compound which would interfere with the stripping of the conductors and the preparation of the conductors for connection to an electrical circuit. Over the layer 17 of pitch a second tape 18 is wound which may similarly be formed of paper or rubber filled tape. Over the tape 18 a stranded conductor 19 is wound with a long pitch spiral. Conductor 19 serves as one conductor of the circuit and is adapted to be connected to the grounded side of the line to provide a ground protection for the cable. The strands of conductor 19 are tinned to protect them from the effect of atmospheric conditions. Over the conductor 19 a metal armor 20 is provided wound with a short pitch spiral in the opposite direction in which the strands of conductor 19 are wound. The armor 20 serves as a mechanical protection for the cable. The armor 20 also serves to continue the electric circuit even though some or all of the strands are broken since it is in continuous contact with the strands throughout their length. As shown, the armor is of the non-interlocking type but it may be desirable in some cases to use an interlocked armor. The armor 20 is galvanized to protect it from atmospheric conditions. Over the armor 20 a fibrous braid 21 is provided which is impregnated with a fire-resisting compound. The provision of the weatherproof protection for the cable beneath the bare conductor 19 increases the weatherproofing protection of the cable, also increases the dielectric strength of the cable due to its location between the bare conductor and the insulated conductors. In addition, the two layers of tape 16 and 18 beneath the stranded conductor 19 protect the insulation of the conductors 10 and 11 by preventing their damage upon the bending of the cable which on the under side of the bend might be damaged by the compression of the strands of conductor 19. Since the conductor 19 is tinned and the armor 20 is galvanized there is not any need for additional protection of these two members from atmospheric conditions. The tapes 16 protects the insulated conductors 10 and 11 from the asphalt or other compound used for protecting the cable from atmospheric conditions and the tape 18 similarly protects the bare conductor 19 from this compound. This permits of the ready connection of the cable to a circuit without the necessity of scraping sticky substances from the conductors.

From the foregoing, it will be seen that an improved armored cable is provided with increased dielectric strength and adequate protection against atmospheric conditions. In addition, the possibility of damage to the cable by the bending or flexing of the cable is considerably reduced due to the location of the two layers of tape beneath the stranded bare conductor.

What we claim as new and desire to secure by Letters Patent of the United States, is,—

1. An electric cable comprising a conductor, insulation for the conductor, a tape of fibrous material wound spirally over the insulation, a layer of weatherproofing compound, a tape of fibrous material over the compound, a conductor consisting of strands wound spirally over said last named tape, a metal armor over the conductor, and a braid over the armor.

2. An electric cable comprising a plurality of conductors, insulation over the conductors, a tape of fibrous material wound spirally over the combined conductors and insulation, a layer of asphalt pitch covering said tape, a tape of fibrous material covering said layer, a conductor consisting of strands wound spirally over said last named tape, an armor surrounding said last named conductor, and a braid of fibrous material covering said armor.

3. An electric cable comprising a plurality of conductors, a rubber covering over each conductor, a fibrous braid over said rubber, a tape of rubber filled cloth wound spirally over the combined conductors and insulation, a layer of asphalt pitch over said tape, a second rubber filled tape wound spirally over said layer, a conductor consisting of strands wound spirally over said last named tape, an armor wound over said conductor in direct contact with the conductor, and a braid of fibrous material covering said armor.

4. In an electric cable, a plurality of conductors, insulation covering each conductor, a tape wound spirally around both insulated conductors, a layer of bituminous material covering said tape, said tape acting to protect said insulation from contact with said bituminous material, a second tape covering said layer of bituminous material, a conductor consisting of strands wound spirally around said second tape, said second tape protecting said stranded conductor from contact with said bituminous material, an armor comprising a strip wound spirally around said stranded conductor, and an overall covering of fibrous material.

GEORGE CARLSON.
HOMER G. KNODERER.